May 14, 1940.     E. C. BRIDGERS     2,200,688

GASKET

Filed Oct. 27, 1938

Emil C. Bridgers.
INVENTOR

BY Victor J. Evans & Co.
ATTORNEYS

Patented May 14, 1940

2,200,688

UNITED STATES PATENT OFFICE 2,200,688

GASKET

Emil C. Bridgers, San Antonio, Tex.

Application October 27, 1938, Serial No. 237,353

2 Claims. (Cl. 288—26)

My invention relates to improvements in gaskets and more particularly to compressible gaskets intended for interposition between the flanges of pipe joints and the like.

One of the principal objects of my invention is to provide a compressible gasket equipped with means for centering the latter between the flanges of a pipe joint.

Another object of my invention is to provide a gasket of the character described which is simple in construction, durable in use, efficient in operation and economical in manufacture.

Other objects and advantages will be apparent from the following description, appended claims and annexed drawing.

Referring to the drawing wherein like reference characters designate like parts throughout the several views.

My novel form of gasket comprises a body having inner and outer rings 5 and 6, respectively, and said inner ring is encased in said outer ring and has secured therein compressible material 7. The periphery of the outer ring 6 is provided with a fin 8 extending circumferentially and throughout half of the circumference of said ring 6.

Figure 1:
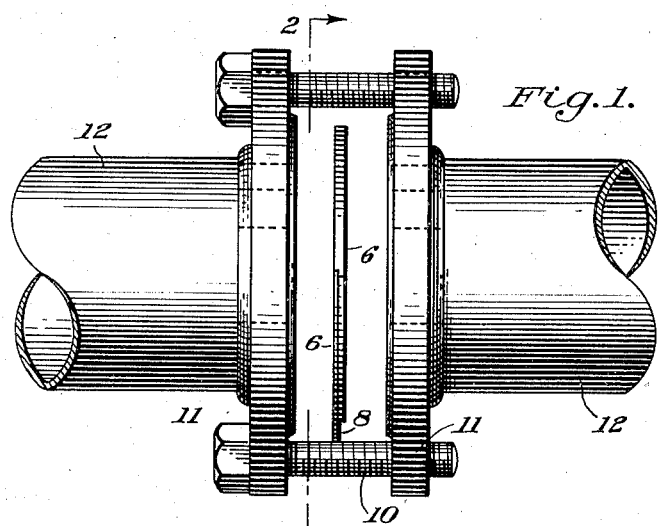
Figure 1 is a side elevation of a pipe joint, in disassembled condition and illustrating my invention as applied thereto.
Figure 2:
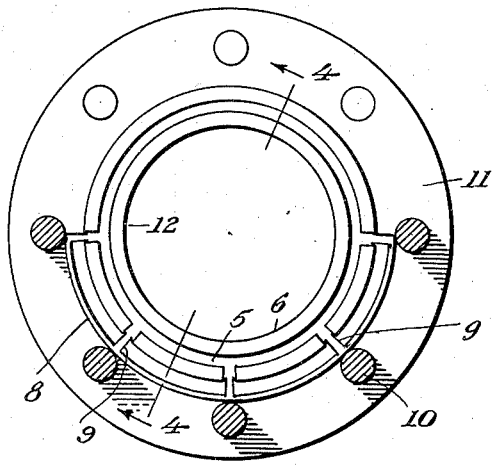
Figure 2 is a sectional view taken on the line 2—2 of Figure 1.
Figure 3:
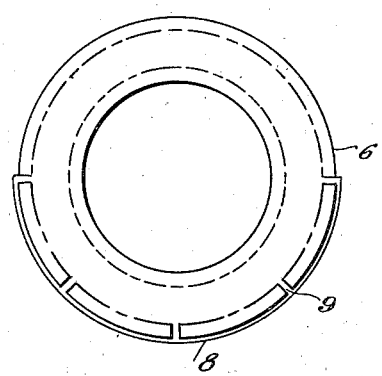
Figure 3 is a plan view of the blank from which the outer ring of my gasket is formed.
Figure 4:
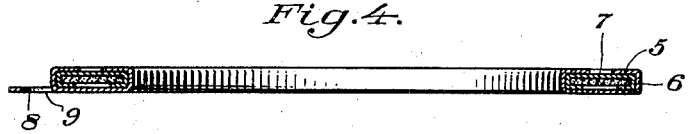
Figure 4 is a detail sectional view of the gasket taken on the line 4—4 of Figure 2.

The fin 8 is spaced from and secured to the outer ring 6 by means of webs 9 located at spaced intervals throughout its length. The fin is adapted to engage bolts 10 in the lower half of the circumference of a pair of flanges 11 fashioned on the ends of pipes 12 and between which the gasket is to be inserted as clearly illustrated in Figure 1.

The fin engages the bolts 10 and axially centers the gasket with respect to the flanges and upon tightening of the bolts said gasket is compressibly secured between the flanges to insure fluid tightness.

It is obvious that the invention is not confined to the herein described use therefore as it may be utilized for any purpose to which it is adaptable. It is therefore to be distinctly understood that the invention is not limited to the specific construction as illustrated and described, as the same is only illustrative of the principles of operation which are capable of extended application in advance forms, and that the invention comprehends all construction within the scope of the appended claims.

What I claim is:

1. A gasket comprising a body fashioned with inner and outer rings with the latter formed with a rim section overlying and embracing said inner ring throughout the entire circumference of the latter, a semi-ring shaped fin partially surrounding said body for engagement with flange bolts for axially centering said body relative to a pair of flanges to which said bolts are connected, and webs integrally connecting said fin to said outer ring and in spaced relation therewith.

2. A gasket comprising a discoidal body fashioned with inner and outer rings with the latter formed with rim and side sections, said rim section overlying and embracing said inner ring throughout the entire circumference of the latter, a semi-ring-shaped fin partially surrounding said body for engagement with flange bolts for axially centering said body relative to a pair of flanges to which said bolts are connected, and webs integrally connecting said fin to said side section and maintaining said fin in spaced relation with respect to said rim section.

EMIL C. BRIDGERS.